United States Patent
Hisada et al.

(10) Patent No.: US 10,275,657 B2
(45) Date of Patent: Apr. 30, 2019

(54) VIDEO SURVEILLANCE SYSTEM, VIDEO PROCESSING APPARATUS, VIDEO PROCESSING METHOD, AND VIDEO PROCESSING PROGRAM

(71) Applicant: NEC Corporation, Minato-ku, Tokyo (JP)

(72) Inventors: Daichi Hisada, Tokyo (JP); Takeshi Moribe, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 14/899,191

(22) PCT Filed: Jun. 25, 2014

(86) PCT No.: PCT/JP2014/066777
§ 371 (c)(1),
(2) Date: Dec. 17, 2015

(87) PCT Pub. No.: WO2014/208575
PCT Pub. Date: Dec. 31, 2014

(65) Prior Publication Data
US 2016/0132731 A1 May 12, 2016

(30) Foreign Application Priority Data
Jun. 28, 2013 (JP) .................... 2013-136953

(51) Int. Cl.
*G06K 9/00* (2006.01)
*H04N 5/76* (2006.01)
(Continued)

(52) U.S. Cl.
CPC ..... *G06K 9/00771* (2013.01); *G06K 9/00718* (2013.01); *G06K 9/6253* (2013.01);
(Continued)

(58) Field of Classification Search
CPC .......... G06K 9/00718; G06K 9/00771; G06K 9/6253; G06K 9/6262; G06K 2009/00738;
(Continued)

(56) References Cited

U.S. PATENT DOCUMENTS 6,970,576 B1 11/2005 Tilsley
8,295,597 B1 * 10/2012 Sharma .............. G06K 9/00342
382/173
(Continued)

FOREIGN PATENT DOCUMENTS

JP 07-028766 A 1/1995
JP H11-344450 A 12/1999
(Continued)

OTHER PUBLICATIONS

International Search Report for PCT Application No. PCT/JP2014/066777, dated Jul. 29, 2014.
(Continued)

*Primary Examiner* — Amara Abdi

(57) ABSTRACT

A video processing apparatus includes a video analyzer that analyzes video data captured by a surveillance camera, detects an event belonging to a specific category, and outputs a detection result, a display controller that displays, together with a video of the video data, a category setting screen for setting a category of an event included in the video, and a learning data accumulator that accumulates, as learning data together with the video data, category information set in accordance with an operation by an operator to the category setting screen. The video analyzer performs learning processing by using the learning data accumulated in the learning data accumulator.

7 Claims, 19 Drawing Sheets

(51) Int. Cl.
*H04N 7/18* (2006.01)
*G06K 9/62* (2006.01)
*H04N 5/765* (2006.01)
*H04N 5/77* (2006.01)
*H04N 5/915* (2006.01)
*G08B 13/196* (2006.01)

(52) U.S. Cl.
CPC ............ *G06K 9/6262* (2013.01); *H04N 5/76* (2013.01); *H04N 7/181* (2013.01); *G06K 2009/00738* (2013.01); *G08B 13/19613* (2013.01); *G08B 13/19671* (2013.01); *G08B 13/19693* (2013.01); *H04N 5/765* (2013.01); *H04N 5/772* (2013.01); *H04N 5/915* (2013.01)

(58) Field of Classification Search
CPC .......... H04N 5/76; H04N 7/181; H04N 5/765; H04N 5/772; H04N 5/915; G08B 13/19613; G08B 13/19671; G08B 13/19693
See application file for complete search history.

(56) References Cited

U.S. PATENT DOCUMENTS

2004/0075738 A1* 4/2004 Burke ............. G08B 13/19656
348/143
2008/0193010 A1* 8/2008 Eaton ................. G06K 9/00771
382/159
2008/0240579 A1* 10/2008 Enomoto ........... G06K 9/00711
382/224
2012/0203840 A1* 8/2012 Yoshimine ........... G11B 27/034
709/204

FOREIGN PATENT DOCUMENTS

| JP | 2000-057349 | * | 2/2000 | ............. G01N 21/88 |
| JP | 2000-057349 | A | 2/2000 | |
| JP | 2000-099727 | * | 4/2000 | ............... G06Y 7/00 |
| JP | 2000099727 | A | 4/2000 | |
| JP | 2003-506806 | A | 2/2003 | |
| JP | 2004-178258 | A | 6/2004 | |
| JP | 2006-148442 | A | 6/2006 | |
| JP | 2008-250908 | A | 10/2008 | |
| JP | 2011-113398 | A | 6/2011 | |
| WO | 2008/098188 | A | 8/2008 | |

OTHER PUBLICATIONS

Japanese Office Communication Report of Reconsideration by Examiner before Appeal (RREA) drafted on Jul. 6, 2017 of Corresponding Japanese Patent Application No. 2015-524069 with English Translation.
Japanese Office Action for JP Application No. 2017-118616 dated Jul. 26, 2018 with English Translation.

* cited by examiner

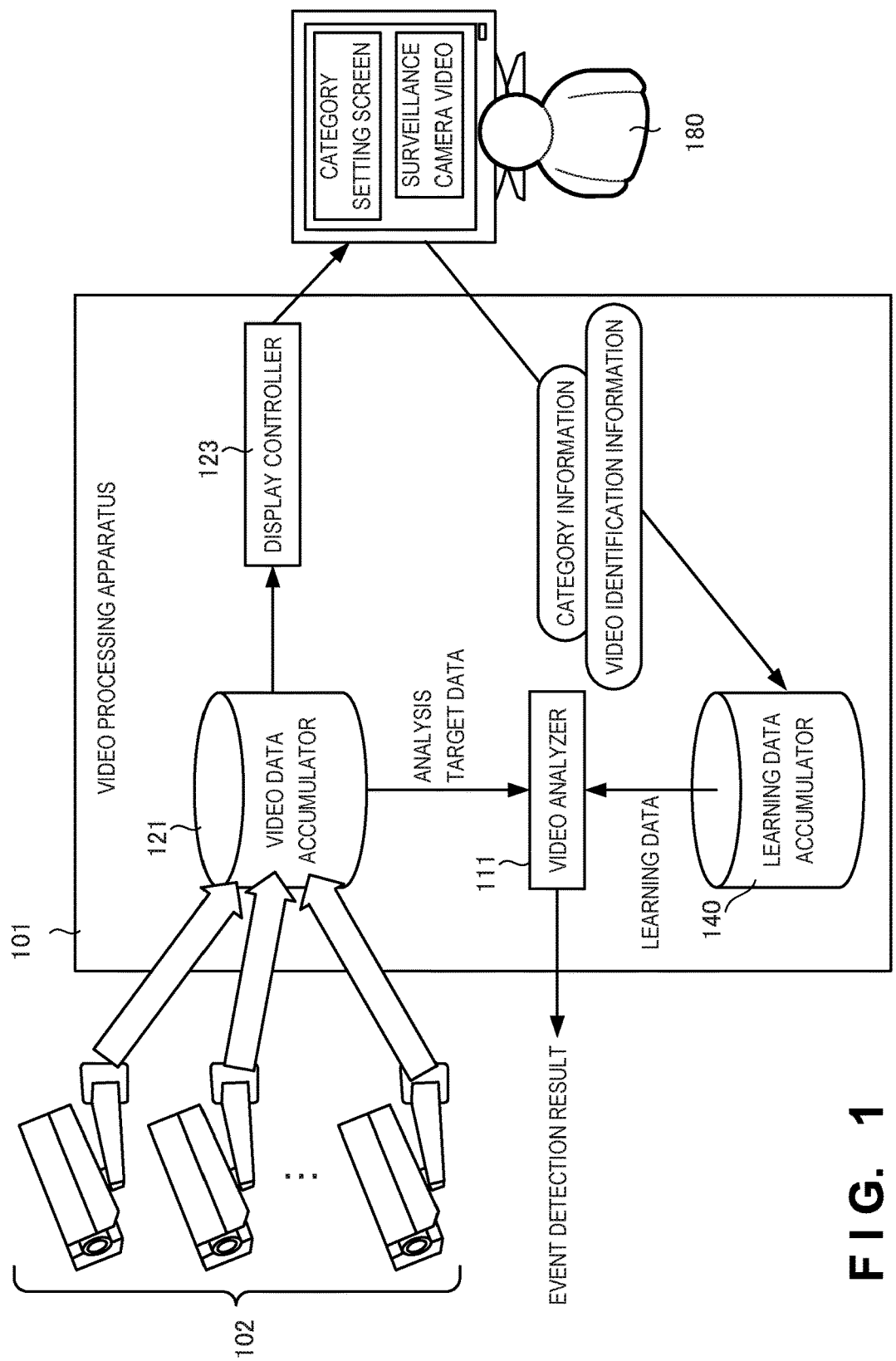
F I G. 1

517

| CATEGORY NAME | CATEGORY TYPE | SHAPE/TRACK INFORMATION | THRESHOLD OF SIZE |
|---|---|---|---|
| GUN | SHAPE | L SHAPE | 300cm² |
| FALL | ACTION | FROM VERTICAL DIRECTION TO HORIZONTAL DIRECTION | 150–200cm |
| DRUG TRAFFICKING | SYNCHRONIZATION BETWEEN PLURAL OBJECTS | REPETITION OF GATHERING AND SEPARATION | 1min–5mins |
| ⋮ | ⋮ | ⋮ | ⋮ |

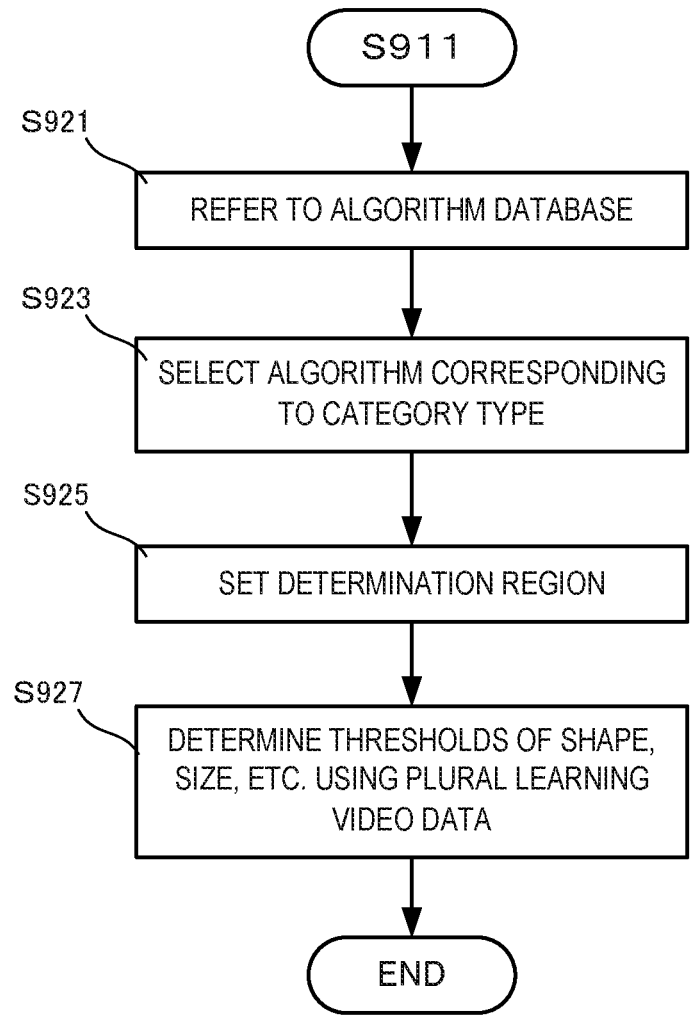
F I G. 9B

1026

| 1101 | 1102 | 1103 | 1104 |
|---|---|---|---|
| OPERATOR ID | LEARNING VIDEO COUNT | NEW CATEGORY COUNT | POINT |
| ... | ... | ... | ... |
| | | | |

FIG. 11

VIDEO SURVEILLANCE SYSTEM, VIDEO PROCESSING APPARATUS, VIDEO PROCESSING METHOD, AND VIDEO PROCESSING PROGRAM

This application is a National Stage Entry of PCT/JP2014/066777 filed on Jun. 25, 2014, which claims priority from Japanese Patent Application 2013-136953 filed on Jun. 28, 2013, the contents of all of which are incorporated herein by reference, in their entirety.

TECHNICAL FIELD

The present invention relates to a technique of analyzing a video from a surveillance camera.

BACKGROUND ART

In the above technical field, patent literature 1 discloses a technique of obviating the need for previous knowledge and prior learning of a behavior recognition system by real-time learning.

CITATION LIST

Patent Literature

Patent literature 1: WO 2008/098188

SUMMARY OF THE INVENTION

Technical Problem

In the technique described in the above literature, however, behavior recognition is performed by machine learning, and a predetermined behavior is characterized as a normal or abnormal behavior based on past observation of similar objects. Since a system operator does not positively perform intervention and support, discriminator learning in the course of operation cannot be performed. That is, the analytical accuracy cannot be improved during actual operation of the behavior analysis system.

The present invention enables to provide a technique of solving the above-described problem.

Solution to Problem

One aspect of the present invention provides a video processing apparatus comprising:
a video analyzer that analyzes video data captured by a surveillance camera, detects an event belonging to a specific category, and outputs a detection result;
a display controller that displays, together with a video of the video data, a category setting screen for setting a category of an event included in the video; and
a learning data accumulator that accumulates, as learning data together with the video data, category information set in accordance with an operation by an operator to the category setting screen,
wherein the video analyzer performs learning processing by using the learning data accumulated in the learning data accumulator.

Another aspect of the present invention provides a video surveillance system comprising:
a video data accumulator that accumulates video data captured by a surveillance camera;
a video analyzer that analyzes the video data accumulated in the video data accumulator, detects an event belonging to a specific category, and outputs a detection result;
a display controller that displays, together with a video of the video data accumulated in the video data accumulator, a category setting screen for setting a category of an event included in the video; and
a learning data accumulator that accumulates, as learning data together with the video data, category information set in accordance with an operation by an operator to the category setting screen,
wherein the video analyzer performs learning processing by using the learning data accumulated in the learning data accumulator.

Still another aspect of the present invention provides a video processing method comprising:
analyzing video data captured by a surveillance camera by using a video analysis module, detecting an event belonging to a specific category, and outputting a detection result;
displaying, together with a video of the video data, a category setting screen for setting a category of an event included in the video;
accumulating, as learning data together with the video data, category information set in accordance with an operation by an operator to the category setting screen; and
performing learning processing of the video analysis module by using the learning data accumulated in the accumulating.

Still other aspect of the present invention provides a video processing program for causing a computer to execute a method, comprising:
analyzing video data captured by a surveillance camera by using a video analysis module, detecting an event belonging to a specific category, and outputting a detection result;
displaying, together with a video of the video data, a category setting screen for setting a category of an event included in the video;
accumulating, as learning data together with the video data, category information set in accordance with an operation by an operator to the category setting screen; and
performing learning processing of the video analysis module by using the learning data accumulated in the accumulating.

Advantageous Effects of Invention

According to the present invention, the video analytical accuracy can be increased effectively and efficiently during actual operation of a surveillance system.

BRIEF DESCRIPTION OF THE DRAWINGS

FIG. 1 is a block diagram showing the arrangement of a video processing apparatus according to the first embodiment of the present invention;

FIG. 9B is a flowchart showing the sequence of learning processing in the video surveillance system according to the second embodiment of the present invention;

FIG. 11 is a block diagram showing the contents of an incentive table in the video surveillance system according to the third embodiment of the present invention;

DESCRIPTION OF THE EMBODIMENTS

Figure 2A:
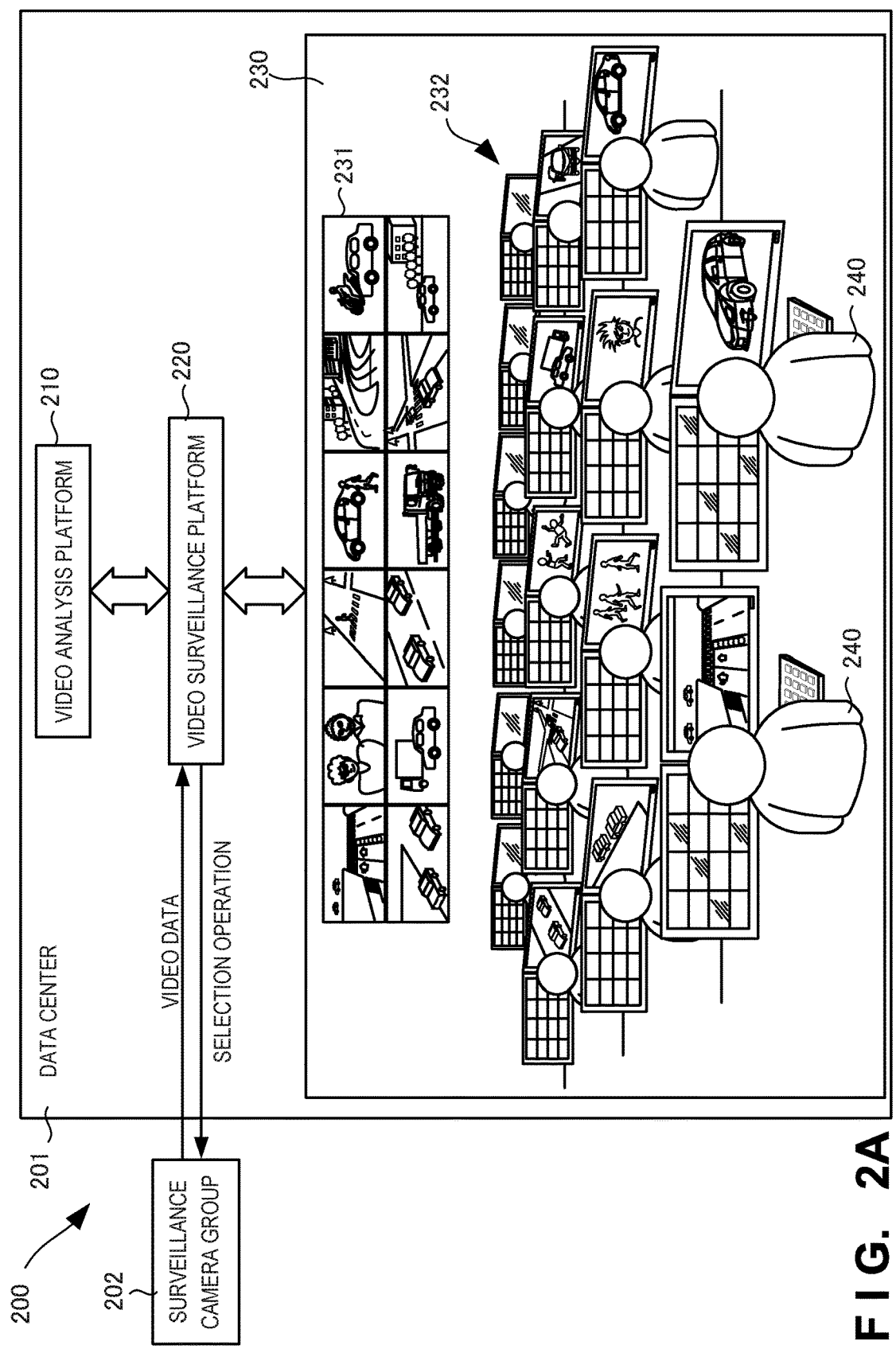
FIG. 2A is a block diagram showing the arrangement of a video surveillance system according to a prerequisite technique of the present invention.

Preferred embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

First Embodiment

A video processing apparatus 101 according to the first embodiment of the present invention will be described with reference to FIG. 1. As shown in FIG. 1, the video processing apparatus 101 includes a video data accumulator 121, a video analyzer 111, a display controller 123, and a learning data accumulator 140.

The video data accumulator 121 accumulates video data captured by surveillance cameras 102. The video analyzer 111 analyzes the video data accumulated in the video data accumulator 121, detects an event belonging to specific category information, and outputs the detection result. Together with the video of the video data accumulated in the video data accumulator 121, the display controller 123 displays a category information setting screen for setting category information of an event included in the video. The learning data accumulator 140 accumulates, as learning data, category information set in accordance with an operation by an operator 180 to the category information setting screen, and video data for which the category information is set. The video analyzer 111 performs learning processing by using learning data accumulated in the learning data accumulator 140.

According to the first embodiment, the video analytical accuracy can be increased effectively and efficiently during actual operation of the surveillance system.

Second Embodiment

The second embodiment of the present invention is directed to a technique of collecting learning videos of detection targets of a video detection engine for respective categories, and utilizing the collected learning videos for new module creation and default module accuracy improvement. In the following description, a term "video" is used not as a concept meaning only a moving image, but as a concept including even a still image.

(Prerequisite Technique)

Figure 2B:
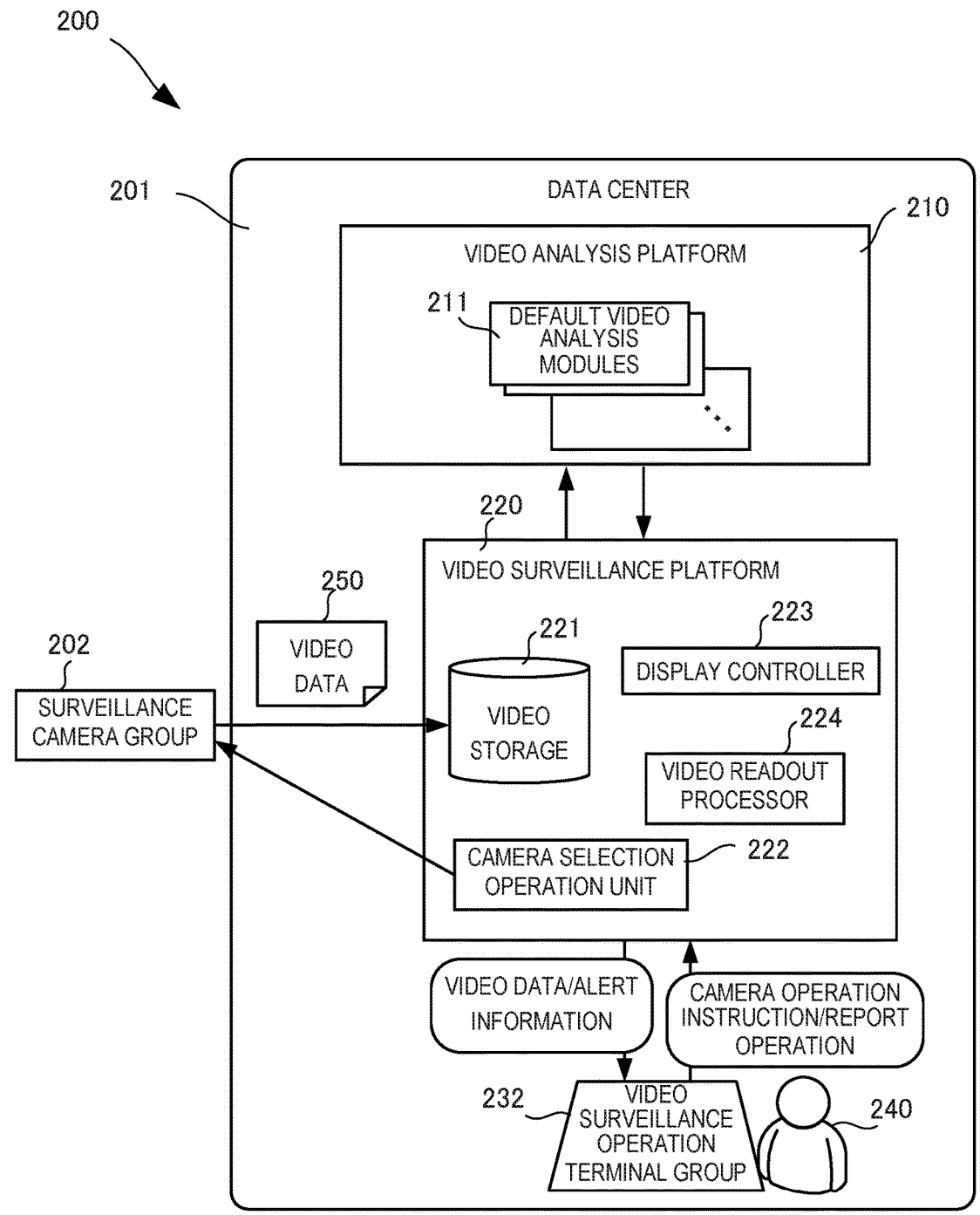
FIG. 2B is a block diagram showing the arrangement of the video surveillance system according to the prerequisite technique of the present invention.

First, a prerequisite technique for a video surveillance system according to the second embodiment of the present invention will be explained with reference to FIGS. 2A to 4. FIGS. 2A and 2B are views for explaining a video surveillance system 200 as the prerequisite technique according to this embodiment.

As shown in FIG. 2A, the video surveillance system 200 includes a data center 201 and a surveillance camera group 202. The data center 201 includes a video analysis platform 210 and a video surveillance platform 220, and further includes a plurality of video surveillance operation terminal groups 232. FIG. 2A shows the state of a video surveillance room 230 including the plurality of video surveillance operation terminal groups 232. In the video surveillance room 230, operators 240 check surveillance target videos while observing the 2-screen monitors of the respective terminals of the video surveillance operation terminal groups 232. FIG. 2A shows an example of a case in which the left screen provides a 16-screen division display and the right screen provides a 1-screen enlarged display. However, the present invention is not limited to this, and any display is possible. For example, the left and right screens may be interchanged, or the division number on each screen is arbitrary. A plurality of large monitors 231 are provided on the front wall of the video surveillance room 230, and display problematic videos or still screens. In the video surveillance room 230, for example, 200 operators 240 surveil videos of 16 cameras per operator in shifts, and keep surveilling videos of a total of 2,000 cameras 24 hours a day, 360 days a year. While observing videos of 16 assigned surveillance cameras, each operator 240 finds out problematic behaviors such as a runaway car, dangerous goods including a gun and knife, theft, snatch, running away from home, injury case, murder, drug trafficking, and trespassing, and things and actions (for example, suspicious individuals or the movement of the crowd) corresponding to them. The operator 240 then reports the detected problematic behavior to a supervisor. The supervisor reconfirms the video, and if necessary, contacts the police or hospital and cooperates to rescue the victim or arrest the criminal.

The video surveillance platform 220 is called a VMS (Video Management System), and performs save of video data acquired from the surveillance camera group 202 and delivery to the video surveillance operation terminal groups 232. As a result, the video surveillance operation terminal group 232 performs real-time display of video data in accordance with a predetermined assignment rule. The video surveillance platform 220 selects one surveillance camera of the surveillance camera group 202 in accordance with a request from the operator 240 who operates the video surveillance operation terminal group 232, and sends a PTZ (Pan, Tilt, Zoom) operation instruction.

The video analysis platform 210 performs analysis processing on video data saved in the video surveillance platform 220, and when there is video data meeting a condition, transmits category information designating target video data to the video surveillance platform 220. The video surveillance platform 220 generates an alert screen in accordance with the category information received from the video analysis platform 210, and notifies a predetermined terminal of the video surveillance operation terminal group 232. In some cases, the video analysis platform 210 performs forcedly enlarged display of a problematic video and display on the large monitor 231.

FIG. 2B is a block diagram showing the detailed arrangement of the video surveillance system 200. As shown in FIG. 2B, the video surveillance platform 220 collects video data 250 from the surveillance camera group 202, adds the extraction time, camera position, camera ID, and another information to the video data 250, and accumulates the video data 250 in a video storage 221. A camera selection operation unit 222 receives designation of a camera and a PTZ (Pan, Tilt, Zoom) operation instruction from the operator 240 via the video surveillance operation terminal group 232, and operates the designated surveillance camera.

The video surveillance platform 220 includes a display controller 223 that displays an alert on the video surveillance operation terminal group 232, and a video readout processor 224 that performs playback/editing of past videos saved in the video storage 221 in accordance with an instruction from the video surveillance operation terminal group 232.

The video analysis platform 210 includes default video analysis modules 211. The respective video analysis modules are constituted by algorithms and/or parameters for detecting problematic videos of different types. The default video analysis modules 211 detect videos including preset events by using algorithms and parameters prepared in advance, and transmit category information prepared in advance to the video surveillance platform 220 for the detected video data.

Figure 3:
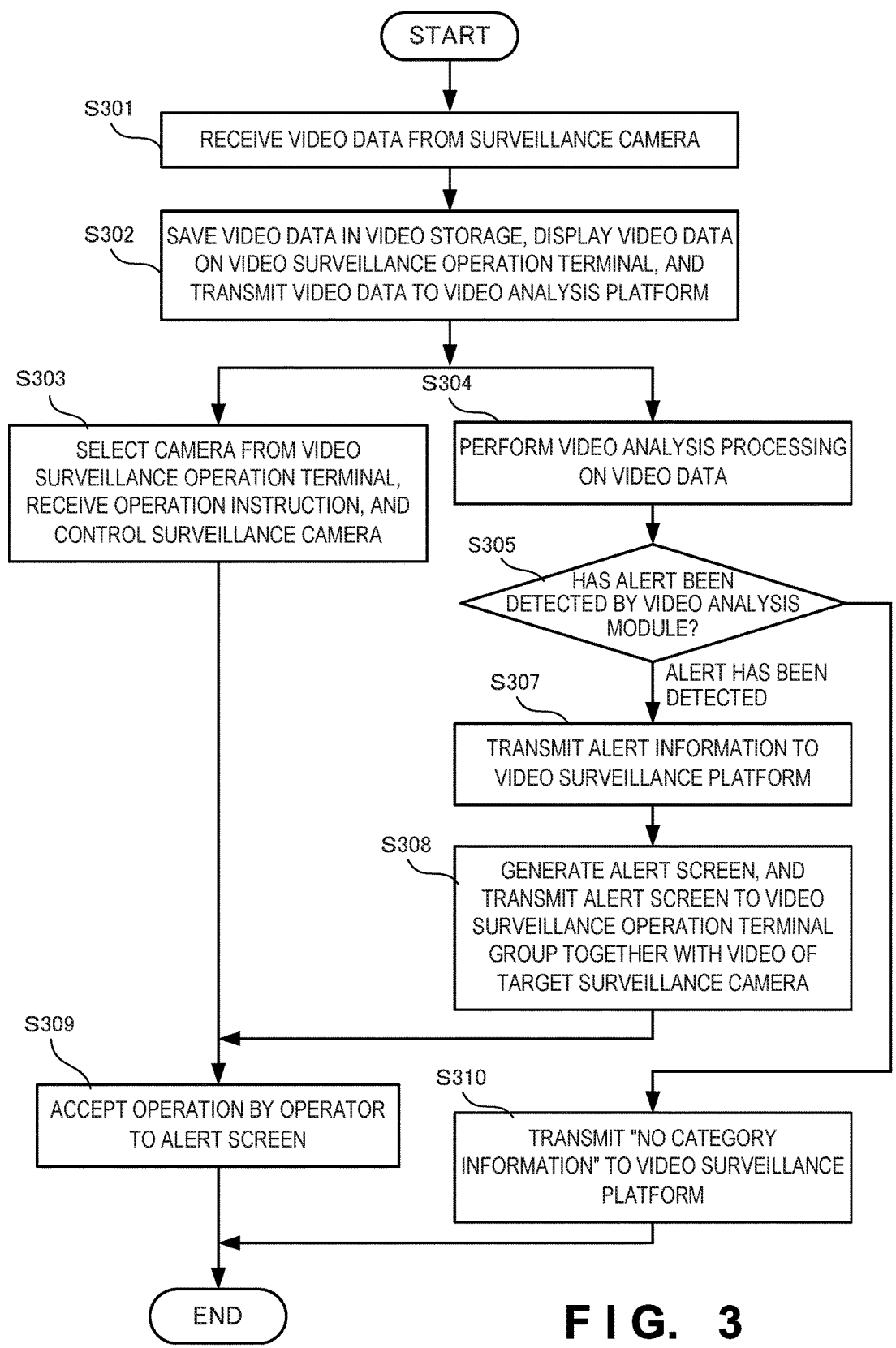
FIG. 3 is a flowchart showing the sequence of processing in the video surveillance system according to the prerequisite technique of the present invention.

FIG. 3 is a flowchart for explaining the sequence of processing in the data center 201. In step S301, the video surveillance platform 220 receives the video data 250 from the surveillance camera group 202.

In step S302, the video surveillance platform 220 saves the received video data 250 in the video storage 221, and transmits the video data 250 to the video surveillance operation terminal group 232 and the video analysis platform 210.

In step S303, the camera selection operation unit 222 receives camera selection information and camera operation information from the operator 240 via the video surveillance operation terminal group 232, and transmits an operation command to a selected surveillance camera.

In step S304, the video analysis platform 210 performs analysis processing of the video data received from the video surveillance platform 220 by using the default video analysis module 211.

If the default video analysis module 211 detects a video meeting a predetermined condition in step S305, it advances to step S307 to transmit category information to the video surveillance platform 220. Even if the default video analysis module 211 has not detected a video meeting the condition, it advances to step S310 to transmit category information "no category information" to the video surveillance platform 220.

In step S308, the display controller 223 of the video surveillance platform 220 generates an alert screen, and transmits it to the video surveillance operation terminal group 232 together with the video of the target surveillance camera.

In step S309, an operation (report operation to the supervisor or police) by the operator 240 to the alert screen is accepted.

Figure 4:
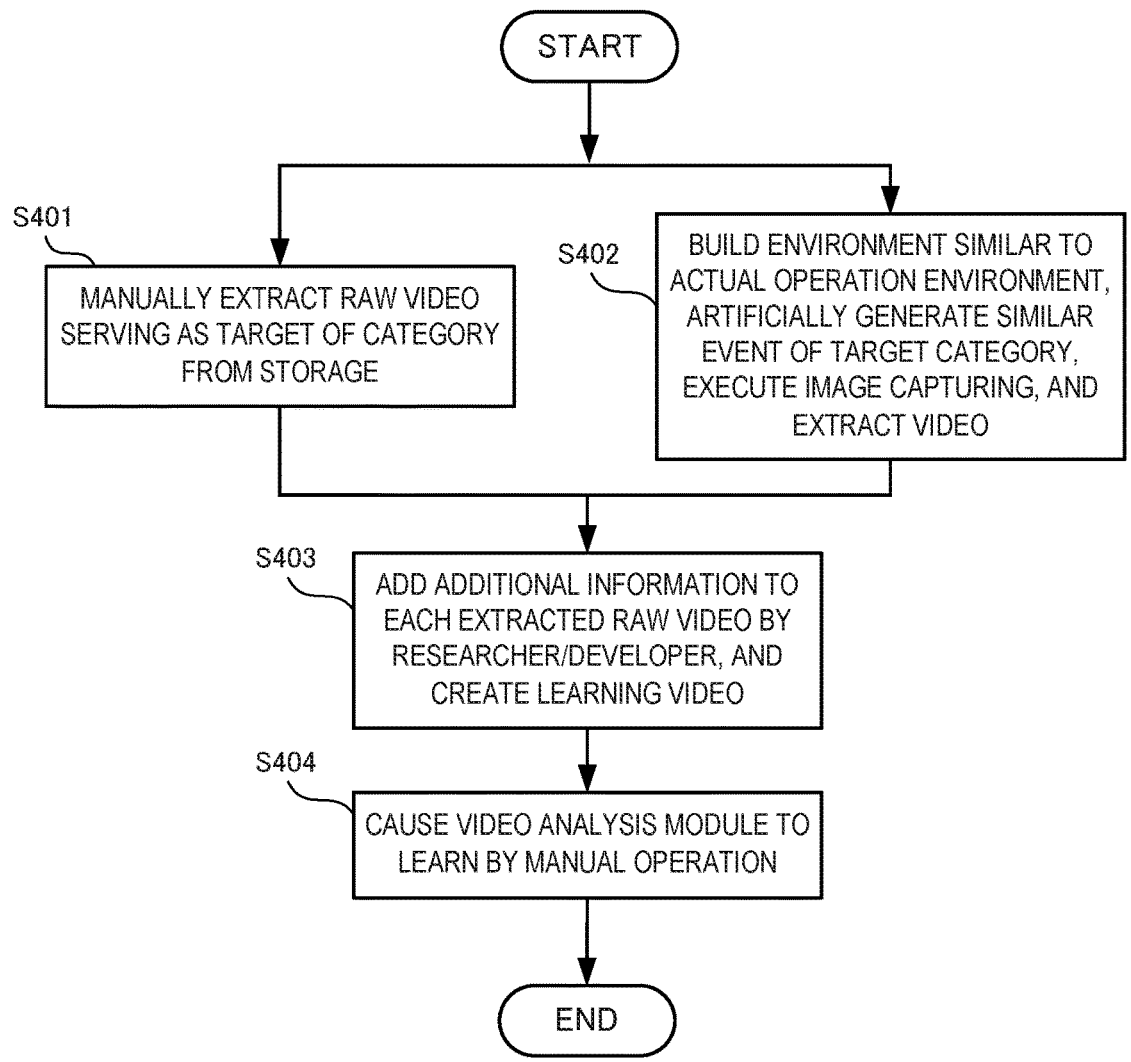
FIG. 4 is a flowchart showing the sequence of learning processing in the video surveillance system according to the prerequisite technique of the present invention.

FIG. 4 is a flowchart for explaining the sequence of processing when generating the default video analysis module 211. This video analysis module generation processing is performed before building the data center 201 on site. In step S401, a large amount of videos each including an event that should be detected is extracted by human eyes from an enormous amount of past videos. Alternatively, in step S402, an event similar to an event that should be detected is intentionally generated in an environment similar to an actual operation environment, image capturing is executed, and a sample video is extracted. In step S403, additional information is manually added to each of the large amount of extracted/collected video data, creating a learning video. In step S404, a researcher/engineer selects an algorithm optimum for a target object, event, or operation, and learning video data is learnt, generating the default video analysis module 211.

(Problem of Prerequisite Technique)

When creating a default video analysis module, the prerequisite technique requires enormous man-hours and a long period for collection and correct answering. For example, face recognition requires 2,000 images, specific event detection in deep learning requires 1,000,000 images, and the hurdle to introduction is high. That is, creation of a video analysis module (discriminator) from a learning video is manually executed, verification of the operation of the video analysis module in the process is individually executed, and an environment is individually maintained. Thus, enormous man-hours and a long period are required.

Recently, as the types of crimes and accidents diversify, demands from operation customers to addition processing for detectable events are growing. In a default video analysis module to which only a learning video collected in an environment different from a surveillance environment is applied, the detection accuracy of a problematic video greatly drops depending on an actual video surveillance environment. In order to fit the default video analysis module to an actual surveillance environment, enormous man-hours and a long period are required.

(Arrangement According to Embodiment)

Figure 5:
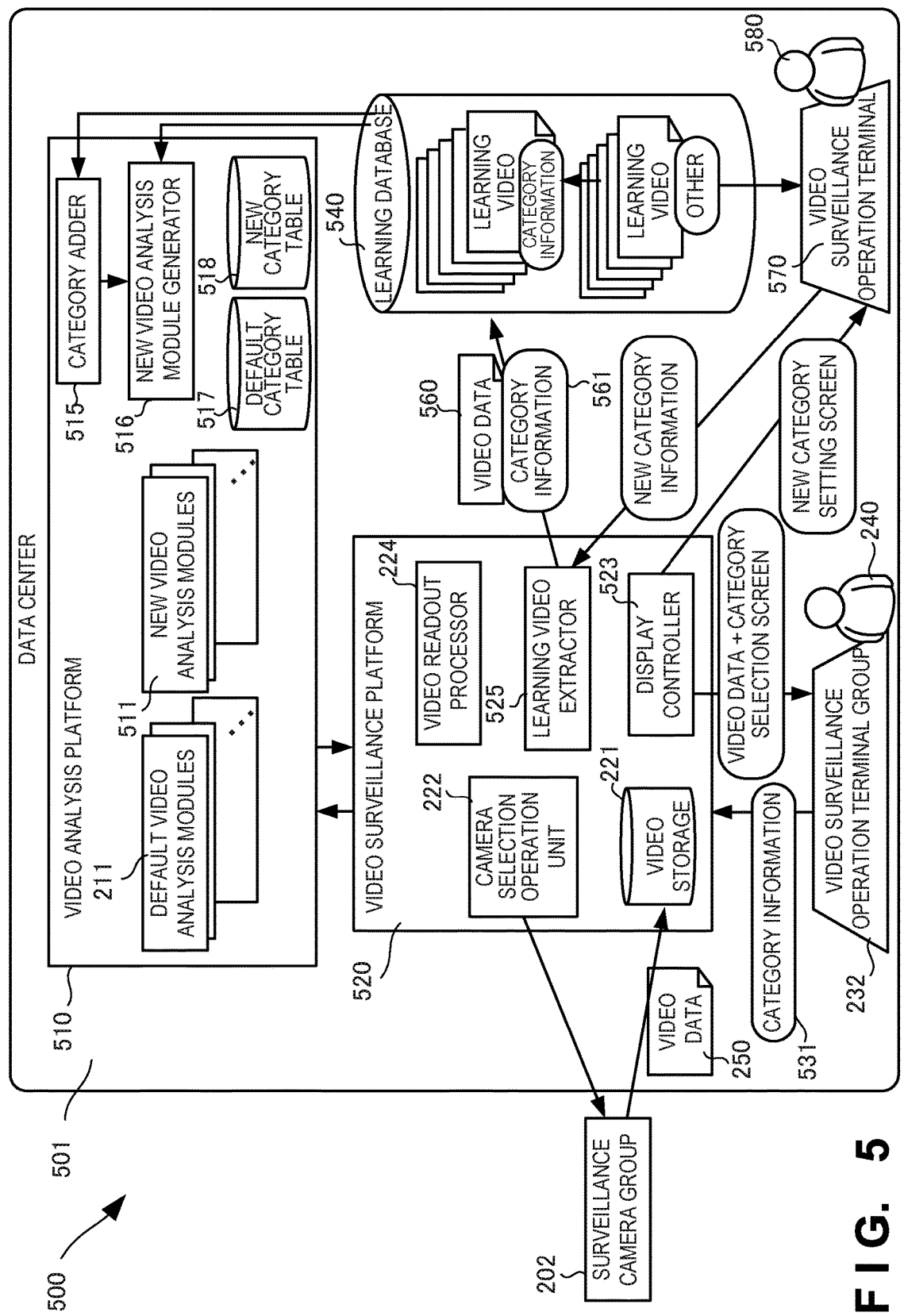
FIG. 5 is a block diagram showing the arrangement of a video surveillance system according to the second embodiment of the present invention.

FIG. 5 is a block diagram showing the arrangement of a video surveillance system 500 as an example of a surveillance information processing system according to the embodiment. The same reference numerals as those in the prerequisite technique denote the same parts, and a description thereof will not be repeated. Unlike the prerequisite technique shown in FIG. 2B, a data center 501 serving as an example of the video processing apparatus according to this embodiment includes a learning database 540 and a video surveillance operation terminal 570. The learning database 540 accumulates learning video data 560 to which category information 561 selected by the operator 240 has been added. The video surveillance operation terminal 570 is a terminal for designating category information by a supervisor 580. A video analysis platform 510 includes new video analysis modules 511 that are newly created, a category information adder 515, and a new video analysis module generator 516. A video surveillance platform 520 newly includes a learning video extractor 525.

Category information is information representing the classification of an object or operation to be detected in a video. Examples of the category information are "gun", "knife", "fight", "runaway", "double riding on motorcycle", and "drug trafficking". The video analysis platform 510 includes category information tables 517 and 518 in which various kinds of category information and their attributes are saved in association with each other.

Figure 6A:
FIG. 6A is a table showing the structure of a category table used in the video surveillance system according to the second embodiment of the present invention.
Figure 6B:
FIG. 6B is a table showing the structure of a category table used in the video surveillance system according to the second embodiment of the present invention.

FIGS. 6A and 6B are tables showing the contents of the default category information table 517 and new category information table 518. Each of the category information tables 517 and 518 stores a category information type, shape, track information, size threshold, and the like in association with a category information name. By looking them up, the video analysis modules 211 and 511 can determine the categories of events included in video data.

Figure 6C:
FIG. 6C shows the contents of category information sent from a video surveillance operation terminal group to a learning video extractor in the video surveillance system according to the second embodiment of the present invention.

FIG. 6C shows the contents of category information 531 sent from the video surveillance operation terminal group 232 to the learning video extractor 525. As shown in FIG. 6C, "category", "camera ID", "video capturing time", "event region", "operator information", and "category type" are registered as the category information 531. The "category" is the classification of an object name and operation to be detected. The "camera ID" is an identifier for specifying a surveillance camera. The "video capturing time" is information representing year, month, day, and time when video data, to which the category information should be added, was captured. The "video capturing time" sometimes indicates a specific period (start to end of extraction). The "event region" is information representing a "target shape", "video background difference", and "position in entire video of background difference" in a video. As the event region, not only a rectangular region, but also various types such as a mask video, background difference video, and polygonal video are prepared. The "operator information" is information of an operator who added category information, and includes an operator ID, name, and the like. The category type is the type of a detection target object/event. For example, the category information "gun" is a category type for which the "shape" of a target gun is accumulated as learning video data. The category "runaway" is a category information type for which learning video data is accumulated with a track from the start point to end point of the background difference of a designated region as "operation". Further, the category information "drug trafficking" is a category information type for which learning video data is accumulated with the track of the background difference in an entire video as "operation".

Referring back to FIG. 5, when the category of an event to be newly detected can be increased by adjusting or adding a parameter in the already existing video analysis modules 211 and 511, the category adder 515 adjusts or adds the parameter to the video analysis modules 211 and 511. When it is determined that the category of an event to be newly detected cannot be increased by adjusting or adding a parameter in the already existing video analysis modules 211 and 511, the category adder 515 generates the new video analysis module 511 by using the new video analysis module generator 516. The category adder 515 distributes the learning video data 560 accumulated in the learning database 540 to the video analysis modules 211 and 511 selected based on the category information 561, and causes the respective video analysis modules to perform learning processing.

Figure 7A:
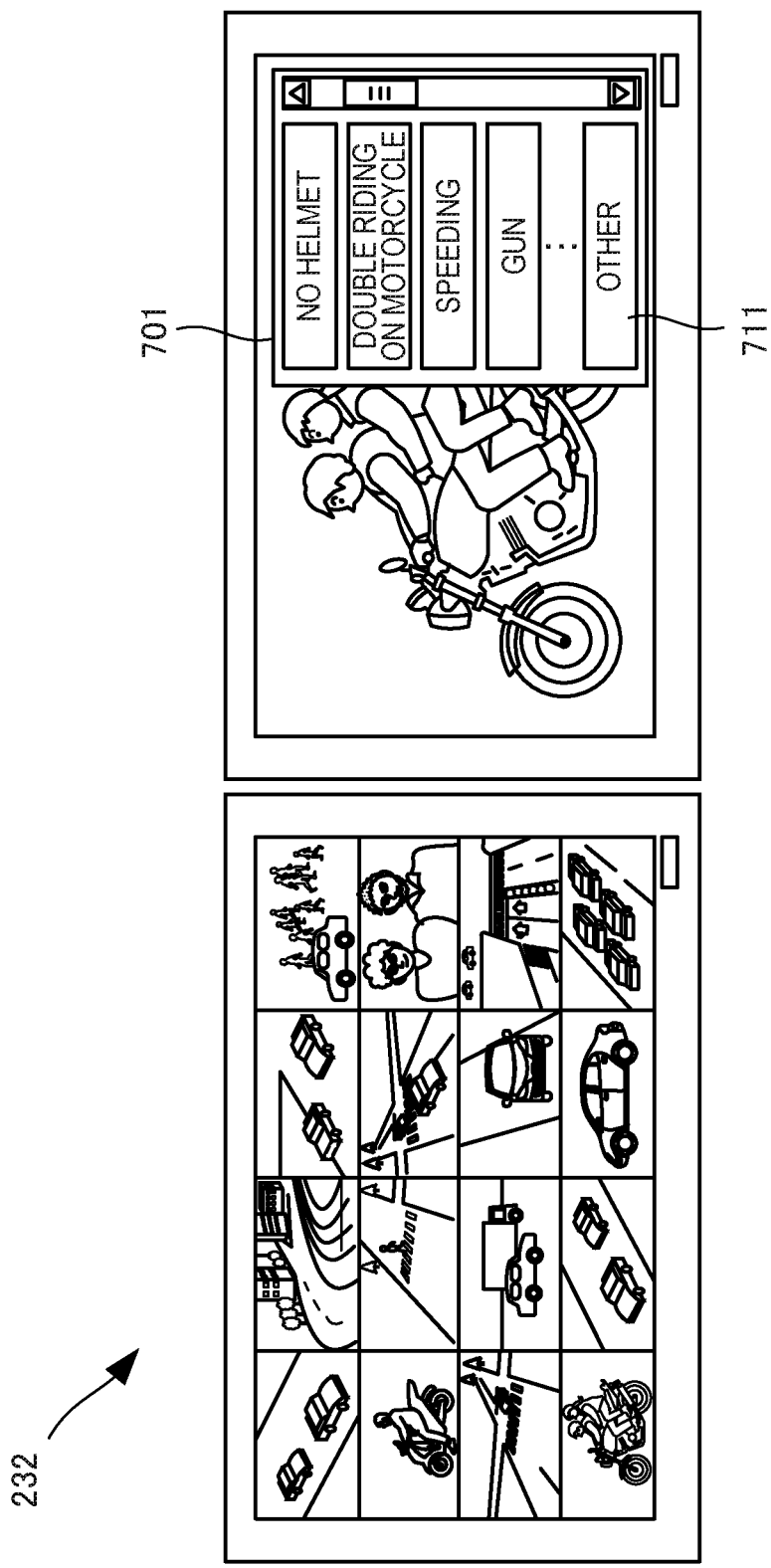
FIG. 7A is a view showing an example of a display image in the video surveillance system according to the second embodiment of the present invention.
Figure 7B:
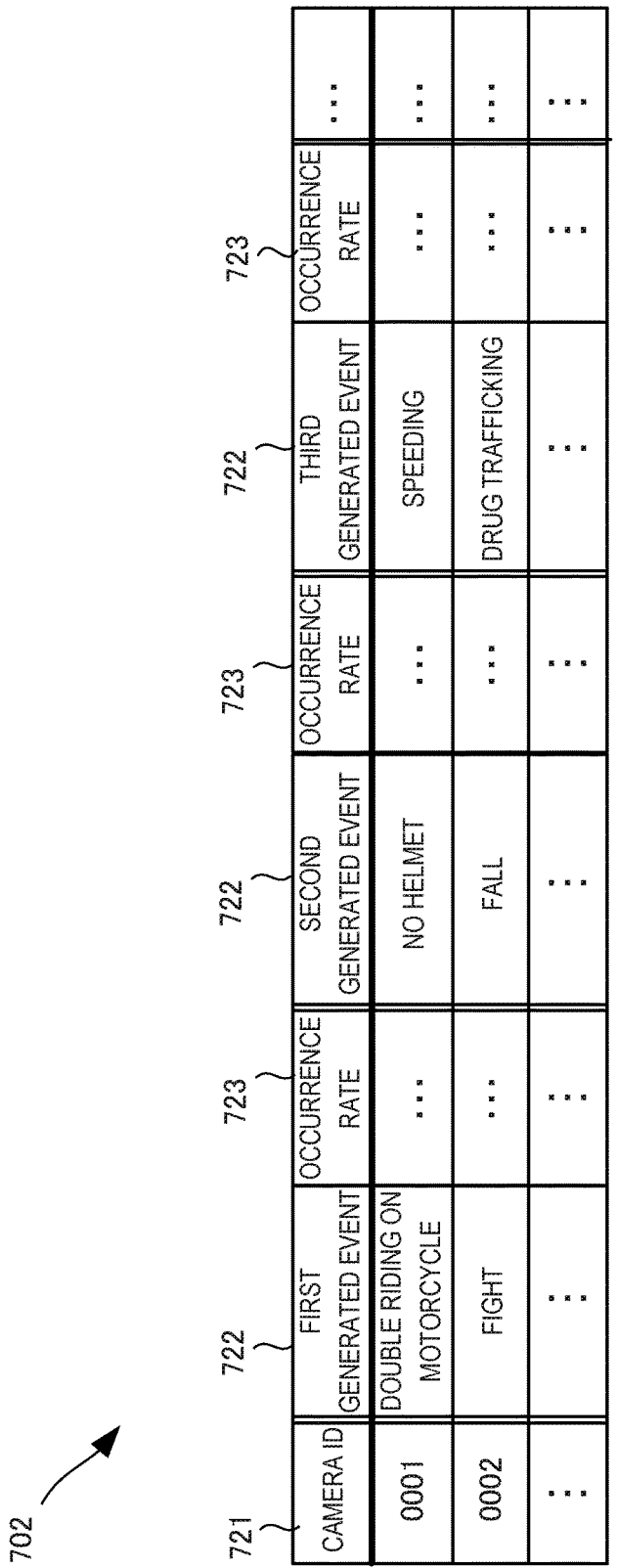
FIG. 7B is a table showing an example of a generated event table for each camera that is stored in the video surveillance system according to the second embodiment of the present invention.

A display controller 523 generates a category information selection screen 701 as shown in FIG. 7A, and sends it to the video surveillance operation terminal group 232. The category information selection screen 701 includes "other" 711 as a choice of category information, in addition to pieces of category information prepared in advance (for example, "no helmet", "double riding on motorcycle", "speeding", "gun", "knife", "drug trafficking", and "fight"). It is preferable to display, in the category information selection screen 701, only some (for example, five) category information candidates predicted in advance by looking up a camera event table 702 shown in FIG. 7B, so as not to lower the motivation of category information selection by the operator 240. In the camera event table 702, pieces of category information of events that are highly likely to be included in videos captured by a camera indicated by a camera ID 721 is accumulated for each camera ID 721. That is, categories 722 and occurrence rates 723 of generated events are sequentially stored in descending order of the occurrence rate. Category information about selected category information is accumulated in the learning database 540 together with video data for which the category information has been selected.

The learning video extractor 525 separately accumulates video data for which the "other" 711 has been selected, in the learning database 540 so that the supervisor 580 can appropriately input detailed category information via the video surveillance operation terminal 570. When "other" is selected, a category information input request is transmitted to the video surveillance operation terminal 570 for the supervisor 580 together with video identification information representing the video data at that time. When the operator 240 executes a category information selection operation during video surveillance through the video surveillance operation terminal group 232, the set 531 of the video identification information and the category is accumulated in the learning database 540 via the video surveillance platform 520. The display controller 523 transmits a new category information generation screen to the video surveillance operation terminal 570 to prompt the supervisor 580 to perform new category information generation processing.

Figure 8:
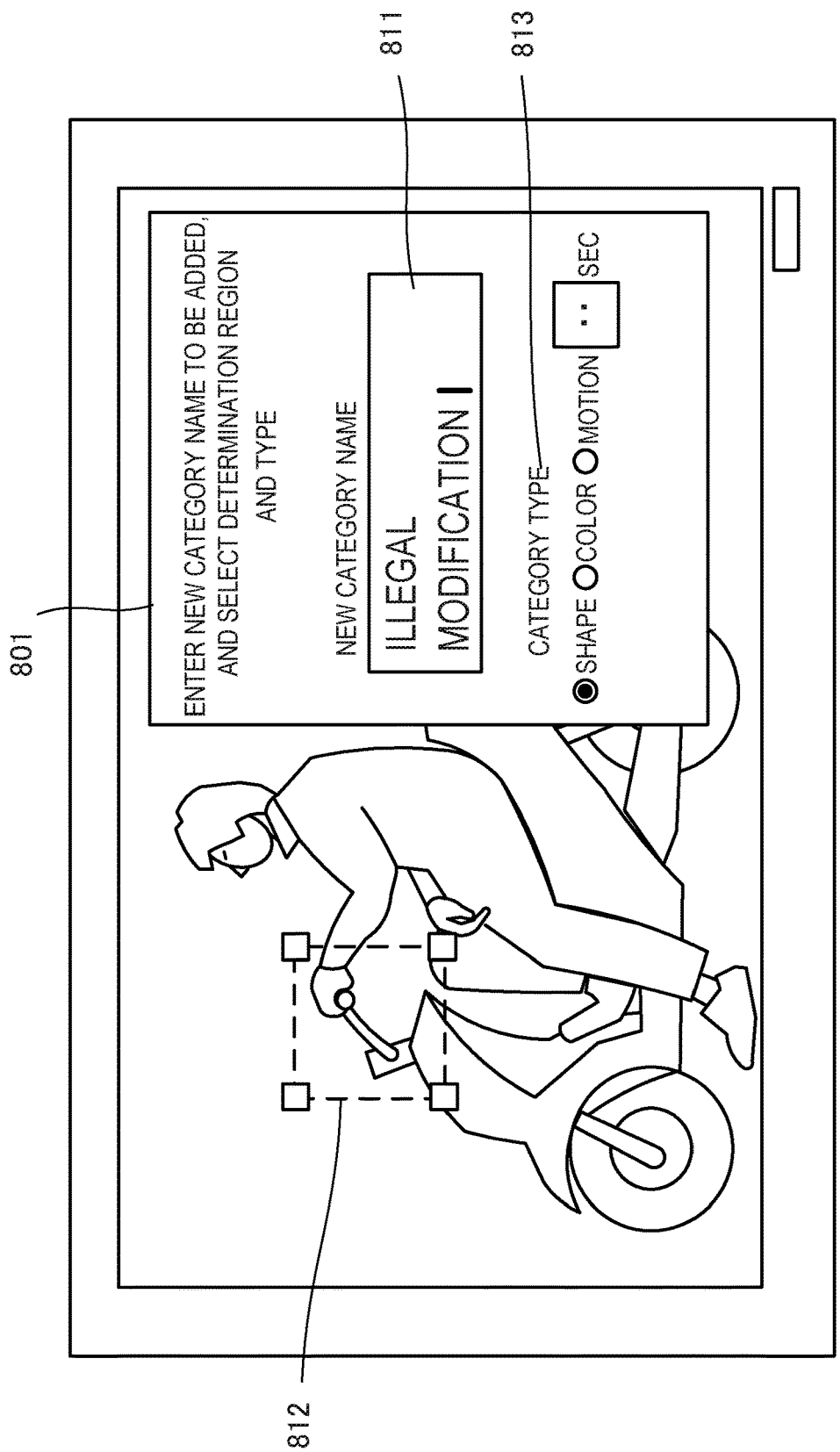
FIG. 8 is a view showing an example of a display image in the video surveillance system according to the second embodiment of the present invention.

FIG. 8 is a view showing a detailed example of a new category information setting screen 801. In the new category information setting screen 801, for example, a region designation graphic object 812 for designating a region of interest in order to detect a video included in the category information is prepared in addition to a category information name input field 811 and a category information type selection field 813. Information for specifying an operator who selected "other" category information, a place where the video was acquired, the time, and the like may be displayed in addition to the new category information setting screen 801 shown in FIG. 8. It is also possible to determine category information of a video close to a video categorized as "other" by video analysis, and present it to the supervisor 580.

The new video analysis module generator 516 selects an existing algorithm fitting new category information, and creates a new video analysis module by a neural network or the like complying with the algorithm. Further, the new video analysis module generator 516 causes the new video analysis module to learn by using accumulated learning video data. As learning and application processing, batch processing or on-the-fly processing can be selected in accordance with category information.

The category information adder 515 performs batch processing or real-time processing, and registers information about added category information in the category information table 518. The default video analysis module 211 or the new video analysis module 511 designates category information to be referred to in the category information table 517 or 518.

The default video analysis module 211 and the new video analysis module 511 perform learning processing by using their learning video data based on designated category information. Hence, the video analytical accuracy of the default video analysis module 211 is improved, and the new video analysis module 511 is completed as a new video analysis module.

When there is no existing algorithm fitting a new category, the new video analysis module generator 516 may automatically generate a new algorithm (for example, even if a plurality of persons pass a person, persons behind are still recognized as persons).

(Sequence of Processing)

Figure 9A:
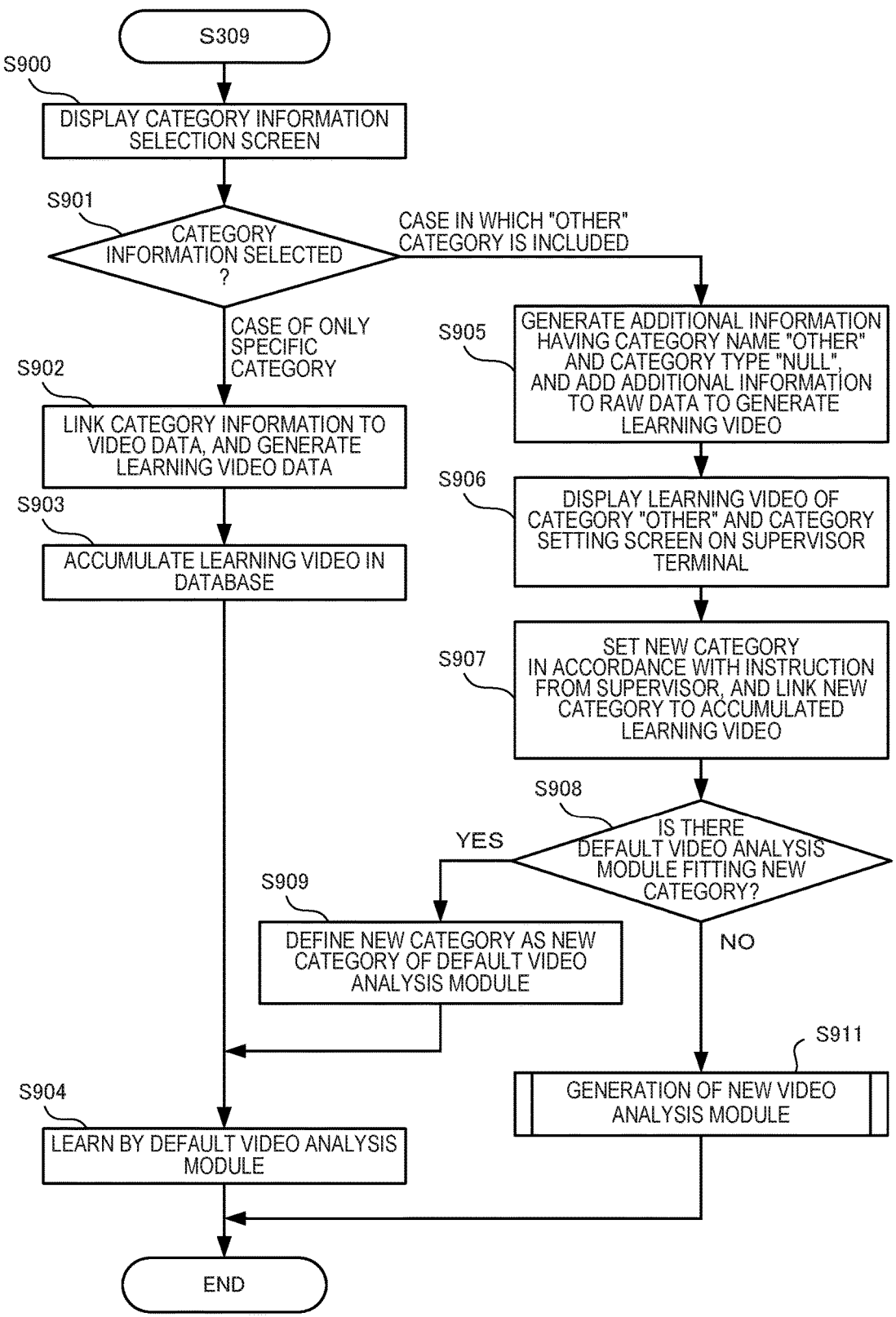
FIG. 9A is a flowchart showing the sequence of learning processing in the video surveillance system according to the second embodiment of the present invention.

FIGS. 9A and 9B are flowcharts for explaining the sequence of processing by the video surveillance system 500. Steps S301 to S309 are the same as the processing of the prerequisite technique described with reference to FIG. 3, so a description thereof will not be repeated, and steps S900 to S911 after step S309 will be explained.

In step S309, the learning video extractor 525 scrutinizes a video. If an alert representing that the video includes an event which should be detected is generated, the process advances to step S900, and the display controller 523 displays the category information selection screen 701 as shown in FIG. 7A in the video surveillance operation terminal group 232.

In step S901, the operator 240 selects category information. If the selected category information is specific category information, the process advances to step S902, and the learning video extractor 525 generates category information, and adds it to video data, generating learning video data.

In step S903, the learning video extractor 525 accumulates the generated learning video data in the learning database 540. In step S904, the default video analysis module 211 performs learning processing.

If the operator 240 selects "other" category information in step S901, the process advances to step S905, and the learning video extractor 525 generates category information having a category information name "other" and a category information type "NULL", and adds it to the learning video data.

In step S906, the learning video extractor 525 stores, in the learning database 540, the learning video data to which the category information "other" has been added. At the same time, the display controller 523 sends the learning video data and the new category information setting screen 801 to the video surveillance operation terminal 570 of the supervisor 580.

In step S907, the category adder 515 receives an instruction from the supervisor 580, sets new category information, and links it to the accumulated learning video data.

After the process advances to step S908, the category information adder 515 determines whether there is the default video analysis module 211 fitting the set new category information. If there is the default video analysis module 211 fitting the set new category information, the process advances to step S909, and the set new category information is set as new category information of the target default video analysis module 211. In step S904, learning is performed using the learning video data to which the new category information has been added.

If there is no default video analysis module 211 fitting the set new category information in step S908, the process advances to step S911, and the new video analysis module 511 is generated and caused to learn a learning video.

FIG. 9B is a flowchart showing the detailed sequence of new video analysis module generation processing in step S911. In step S921, an algorithm database (not shown) is referred to. In step S923, an algorithm corresponding to a category information type designated by the supervisor (for example, an algorithm for extracting a feature vector, or an algorithm for extracting clusters each formed from a set of blobs (small image regions), and boundaries between the clusters) is selected to generate the skeleton of the video analysis program module. In step S925, a video region serving as an analysis target by the video analysis module is set using a determination region designated by the supervisor. In step S927, thresholds for the shape and size of a thing serving as a detection target, and the direction and distance of a motion serving as a detection target are determined using a plurality of learning video data. At this time, it is also possible to extract the feature vectors of a thing serving as a detection target and its operation in the learning video data, and set them as thresholds. When clusters each formed from a set of blobs and boundaries between the clusters are extracted as feature amounts, the feature amounts may be set as thresholds.

According to the second embodiment, the operator can simply accumulate learning videos and add their categories at the same time during actual operation. Therefore, association between semi-automatic learning video collection and the category can be implemented, and localization to an environment and the man-hours and the period for generating a new video analysis module can be suppressed.

Since a video in an operation environment can be learnt, a higher-accuracy video analysis module can be built. This technique is applicable to the security field of video surveillance, guard, and the like. This technique is also applicable to customer orientation analysis in a store or public area based on videos.

Third Embodiment

A video surveillance system according to the third embodiment of the present invention will be described next. The video surveillance system according to the third embodiment is different from the second embodiment in that an incentive to an operator is considered. The remaining arrangement and operation are the same as those in the second embodiment, so the same reference numerals denote the same parts, and a detailed description thereof will not be repeated.

Figure 10:
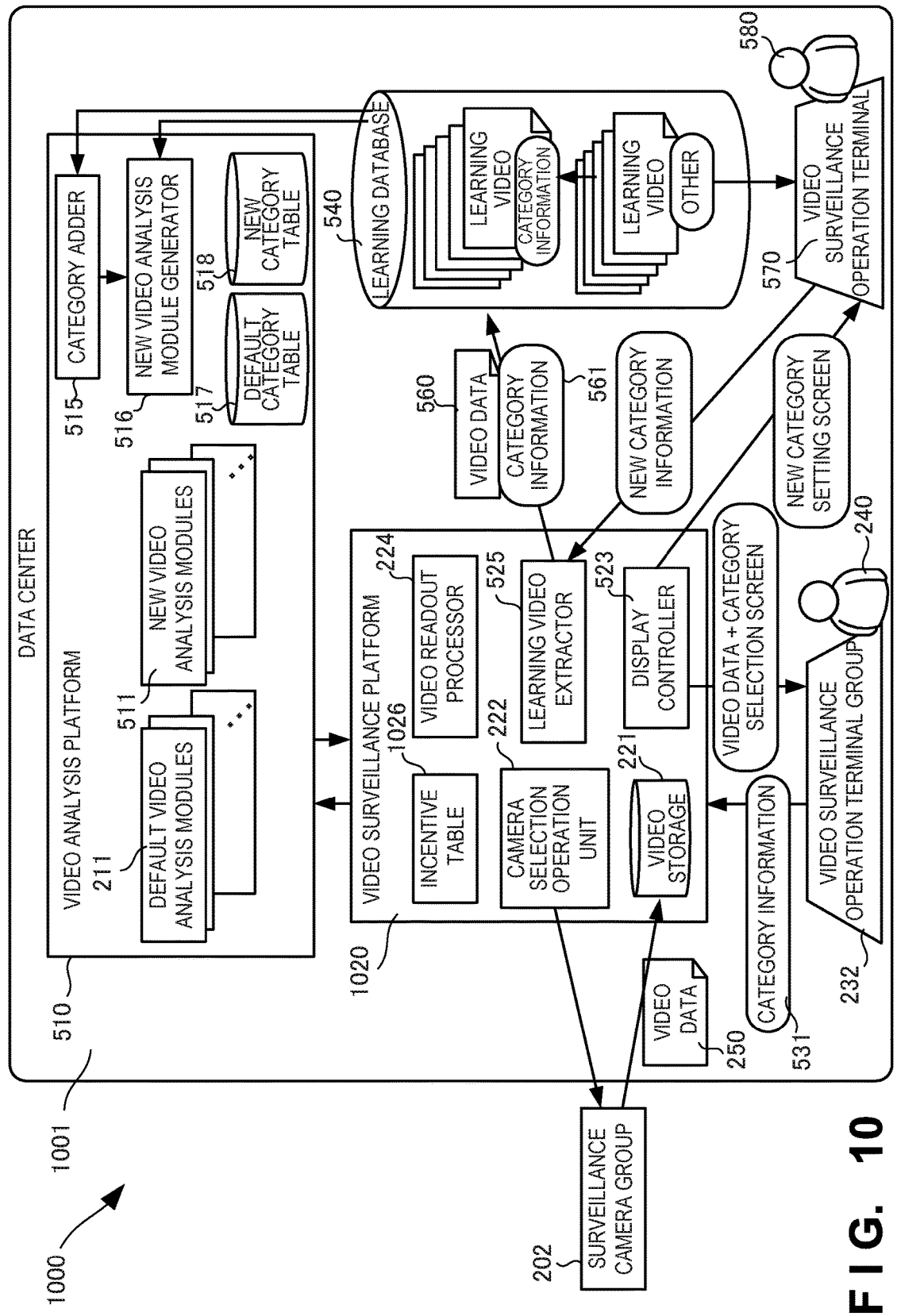
FIG. 10 is a block diagram showing the arrangement of a video surveillance system according to the third embodiment of the present invention.

FIG. 10 is a block diagram showing the arrangement of a video surveillance system 1000 according to the third embodiment. A video surveillance platform 1020 in the video surveillance system 1000 includes an incentive table 1026, unlike the second embodiment. Statistics about the number of learning videos accumulated in a learning database 540 are collected for each operator in the incentive table 1026, and an incentive is added to increase the collection efficiency.

FIG. 11 shows an example of the incentive table 1026. The incentive table 1026 links a learning video count 1102, a new category count 1103, and a point 1104 to an operator ID 1101, and saves and manages them. The learning video count 1102 indicates the number of learning video data to which the operator has selected and added categories. The new category count 1103 indicates the number of categories finally generated as new categories by the supervisor when the operator selects "other" as a category. The learning video count and the new category count can be evaluated as contribution values of surveillance work by an operator. The point 1104 is calculated in accordance with these values, is also linked to an operator ID, and saved and updated. When calculating the point 1104, weighting may also be performed by considering the degree of importance of a video which has been found out by an operator and to which a category has been added.

The motivation of an operator to surveillance work can be aroused by setting the hourly wage, salary, or the like of the operator in accordance with the value of the point 1104. In the incentive table 1026, a value representing the correctness of category addition, other than the point, may be used as a value for evaluating an operator. For example, test video data to which a category as a correct answer is added may be presented to a plurality of operators, the detection speed, detection accuracy, and category correctness probability of each operator may be verified, and an operator evaluation value may be calculated using these values.

Figure 12:
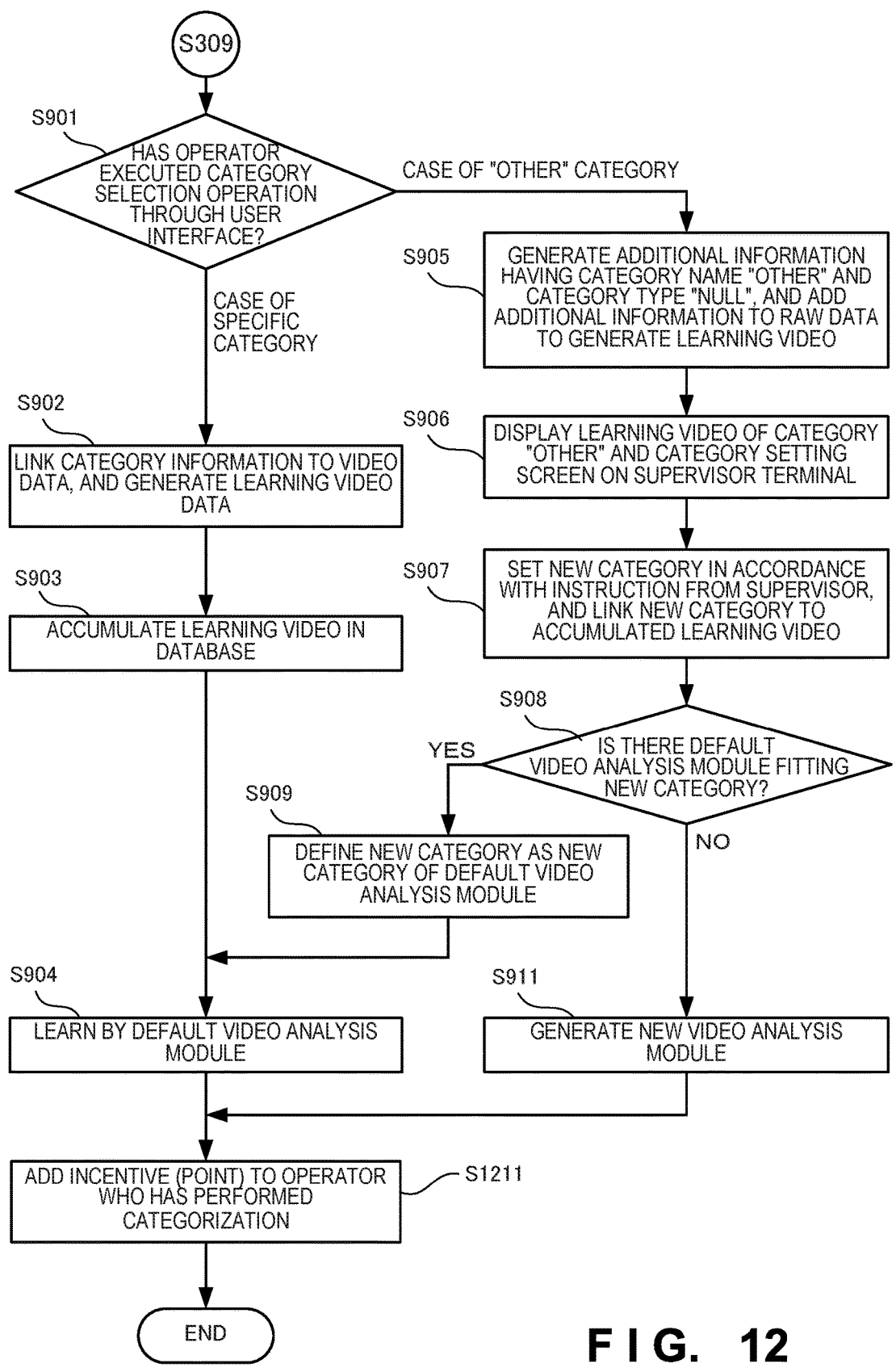
FIG. 12 is a flowchart showing the sequence of learning processing in the video surveillance system according to the third embodiment of the present invention.

FIG. 12 is a flowchart for explaining the sequence of processing by the video surveillance system 1000. When a default video analysis module is caused to learn by category selection and category generation, or a new video analysis module is generated, the process advances to step S1211 to add a point. That is, an incentive (point) corresponding to the category of an event found out by an operator is linked to an operator ID having undergone categorization, and is saved.

According to the third embodiment, the surveillance motivation of an operator can be aroused.

Fourth Embodiment

A system that enables addition and modification of category information from an operator in FIG. 2B, which is a prerequisite technique of a surveillance information system, will be described as an embodiment of the technique.

Figure 13:
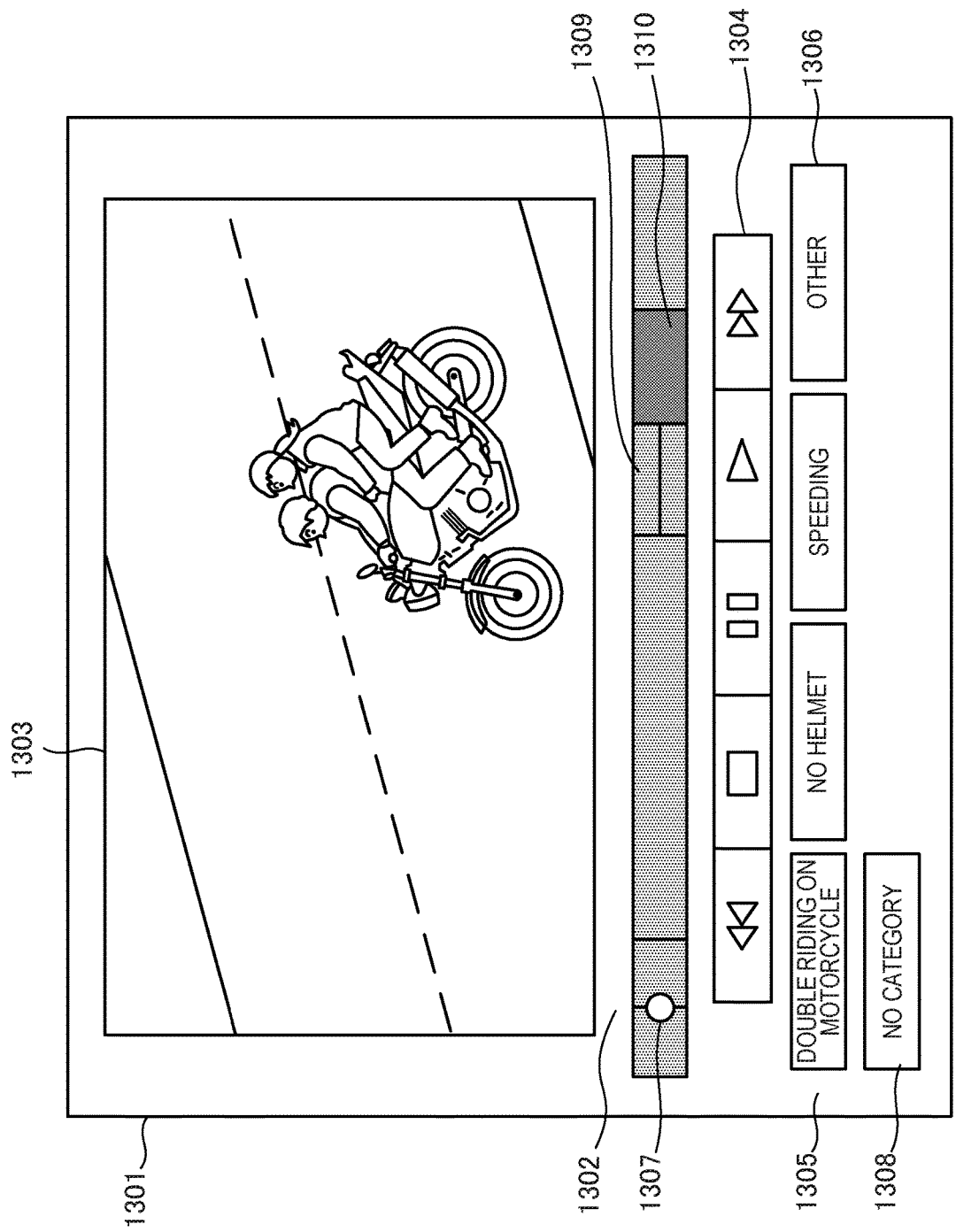
FIG. 13 is a view showing an example of a display image in a video surveillance system according to the fourth embodiment of the present invention.

A display controller 523 generates a category information selection screen 1301 as shown in FIG. 13, and sends it to a video surveillance operation terminal group 232. The category information selection screen 1301 includes a display screen 1303 for a video, a category information bar 1302 representing the generation situation of an alert, video control components 1304 (for example, "playback", "stop", "pause", "rewind", and "fast-forward"), a progress bar 1307 representing the playback situation of a video, and category information setting buttons 1305. The category information setting buttons 1305 include "other" 1306 as a category information choice, in addition to pieces of category information prepared in advance. An operator 240 checks a video by using the video control components 1304. The operator 240 modifies/adds category information of video data displayed on the display screen 1303 by using the category information setting buttons 705. Category information about the category information set by the operator 240 is accumulated in a learning database 540 together with the video data.

Figure 14:
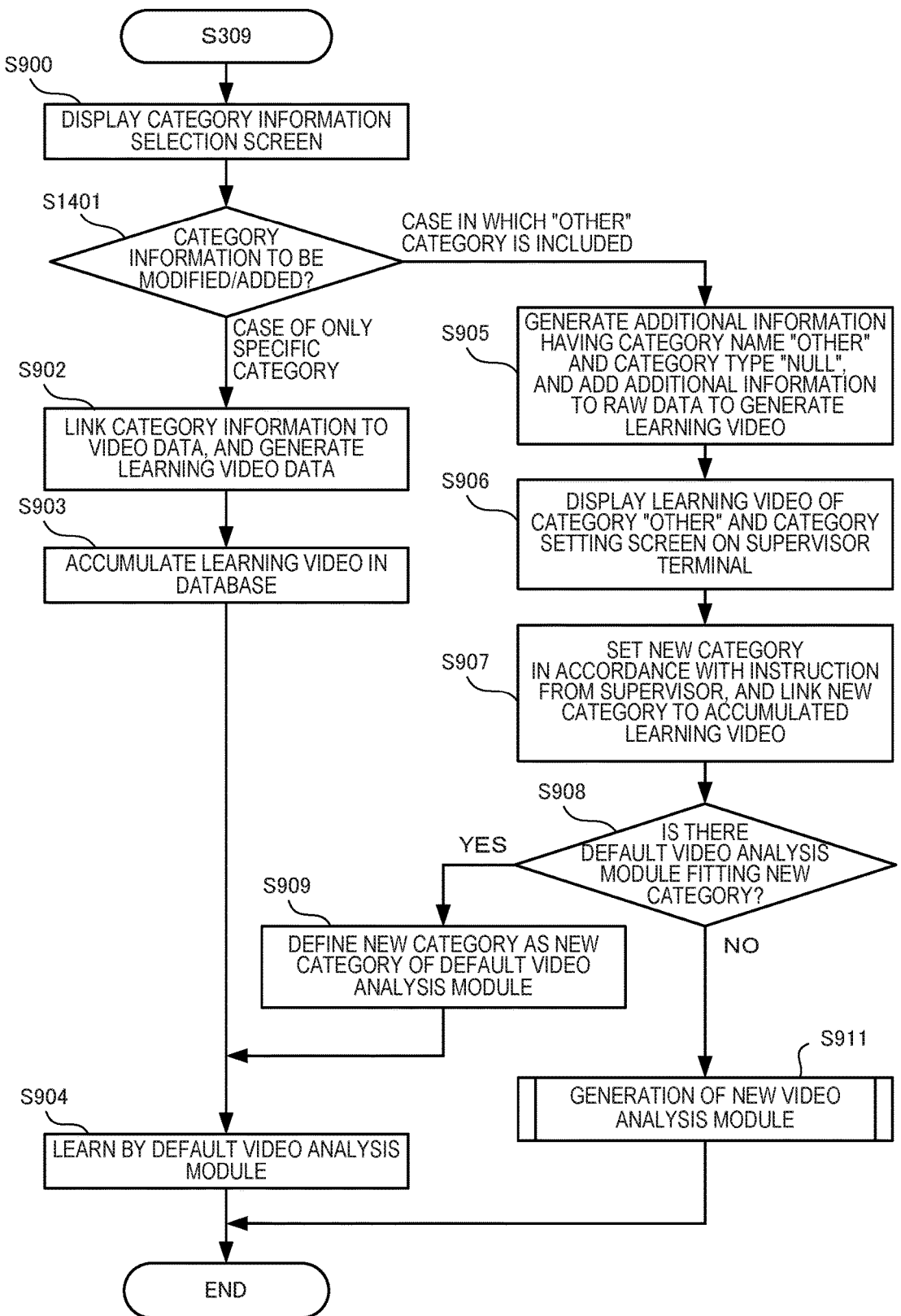
FIG. 14 is a flowchart showing the sequence of learning processing in the video surveillance system according to the fourth embodiment of the present invention.

FIG. 14 is a flowchart for explaining the sequence of processing by a video surveillance system 500. Steps S301 to S309 are the same as the processing of the prerequisite technique described with reference to FIG. 3, so a description thereof will not be repeated, and steps S900 to S910 after step S309 will be explained. Also, steps S900 and S902 to S910 are the same as the processing described with reference to FIG. 9A, so a description thereof will not be repeated, and step S1401 will be explained.

In step S309, a learning video extractor 525 scrutinizes a video. If an alert representing that the video includes an event which should be detected is generated, the process advances to step S900, and the display controller 523 displays the category information selection screen 1301 as shown in FIG. 13 in the video surveillance operation terminal group 232.

In the category information selection screen 1301, a video and its category information are displayed on the display unit 1303 and the category information bar 1302. The category information and video can be confirmed by playback/rewind/fast-forward using the video control components 1304. The category information bar 1302 displays, by color, category information generated for a video displayed in the category information selection screen 1301, and correct category information that has been modified/added by the operator 240. For example, a section in which a "no helmet" alert has been generated is displayed in blue. A section in which no alert has been generated, and a section 1310 in which there is no category information are displayed in black. A section in which a "double riding on motorcycle" alert has been generated is displayed in red. Correct category information modified/added by the operator 240 using the category information setting buttons 1305 is also displayed in the same way.

In step S1401, the operator 240 confirms, by using the category information selection screen 1301, a video for which an alert has been generated, and its category information. Then, the operator 240 modifies/adds category information to a section requiring modification or addition of category information.

At the time of category information modification/addition, the operator 240 presses the category information setting button 1305 corresponding to specific category information while playing back part of the video. For example, modification of a section in which a "no helmet" alert has been generated, to a "double riding on motorcycle" alert will be examined. A section belonging to the "no helmet" category information is displayed in blue on the category information bar 1302. When the target video data is displayed on the display unit 1303 while playing back the video on the display unit 1303 by using the video control components 1304 of the category information selection screen 1301, the operator 240 presses the "double riding on motorcycle" button among the category information setting buttons 1305 to modify the category to the "double riding on motorcycle" category. At this time, the color of the category information bar 1302 corresponding to the section in which the operator 240 has set the category information changes from "blue" to "red".

A plurality of types of category information can also be added to the same section by using the video control components 1304. At this time, the category information bar 1302 for the section to which the pieces of category information have been added is displayed in layers using a plurality of colors. For example, when "no helmet" and "double riding on motorcycle" are added, blue and red are displayed in layers, like a category information bar 1309.

When the operator 240 wants to delete category information, he suffices to press a "no category information" button 1308 while playing back, by using the video control components 1304, a video in a section in which the category information is to be deleted. This equals modifying category information to "no category information". The category information bar 1310 for the section modified to "no category information" is displayed in black, similar to a section in which no alert has been generated.

When modifying/adding category information of a video of a predetermined continuous section, the operator 240 suffices to keep pressing a specific button among the category information setting buttons 1305 while the video in this section is played back. Further, when a section in which the operator 240 wants to modify/add category information is long, the category information setting buttons 1305 may be switched by a toggle method, and the operator 240 may press the button at only the start and end of the section in which he wants to modify/add category information.

If the operator has modified/added correct category information in step S1401, a video analysis module 211 can learn an alert to be output.

When the modified/added category information is specific category information, the process advances to step S902, and the learning video extractor 525 adds the category information to video data, generating learning video data.

The operator confirms the video and the category information from the surveillance information system, and sets correct category information. As a result, a surveillance information system that detects a new object and operation can be built. The accuracy of the surveillance information system can be improved by modifying category information by the operator.

Other Embodiments

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The present invention is applicable to a system including a plurality of devices or a single apparatus. The present invention is also applicable even when an information processing program for implementing the functions of the embodiments is supplied to the system or apparatus directly or from a remote site. Hence, the present invention also incorporates the program installed in a computer to implement the functions of the present invention on the computer, a medium storing the program, and a WWW (World Wide Web) server that causes a user to download the program. Especially, the present invention incorporates at least a non-transitory computer readable medium storing a program that causes a computer to execute processing steps included in the above-described embodiments.

This application claims the benefit of Japanese Patent Application No. 2013-136953 filed on Jun. 28, 2013, which is hereby incorporated by reference herein in its entirety.

What is claimed is:

1. A video processing apparatus comprising:
    a display controller implemented at least by hardware and that displays, together with a video of the video data captured by a surveillance camera, a category setting screen for setting a category included in the video, the category indicating a dangerous goods to be detected or operation to be detected,
    a learning data accumulator implemented at least by a processor executing code from a memory and that accumulates, as learning data together with the video data, information of the category set in accordance with an operation by an operator to the category setting screen; and
    a first video analyzer implemented at least by the processor executing the code from the memory that performs learning processing by using the learning data accumulated in said learning data accumulator, detects a specific category by analyzing said video data, and outputs a detection result,
    wherein said display controller causes the operator to input information necessary for newly generating a new category associated with newly captured video data in the category setting screen, when receiving form the operator that the new category is included in the newly captured video data and cannot be specified by the operator,
    when the new category is newly generated, a second video analyzer, at least having an algorithm different from that of the first video analyzer, for detecting the new category is newly generated.

2. The video processing apparatus according to claim 1, wherein said display controller displays a plurality of categories associated with the video data in the category setting screen so as to be able to modify or add the plurality of categories.

3. The video processing apparatus according to claim 1, wherein said display controller displays a plurality of categories associated with the video data in the category setting screen so as to be able to select the plurality of categories.

4. The video processing apparatus according to claim 1, wherein said learning data accumulator accumulates, as the information of the category, a category name, a video capturing time, a region including the dangerous goods or problematic behaviors, and operator information in said learning data accumulator.

5. A video surveillance system comprising:
    a video data accumulator implemented at least by a processor that executes code from a memory and that accumulates video data captured by a surveillance camera;
    a display controller implemented at least by hardware that displays, together with a video of the video data accumulated in said video data accumulator, a category setting screen for setting a category included in the video, the category indicating a dangerous goods to be detected or operation to be detected;
    a first video analyzer implemented at least by the processor that executes the code from the memory and that performs learning processing by using the learning data accumulated in said learning data accumulator, detects a specific category by analyzing said video data, and outputs a detection result; and
    a learning data accumulator implemented at least by a processor executing code from a memory and that accumulates, as learning data together with the video data, information of the category set in accordance with an operation by an operator to the category setting screen,
    wherein said first video analyzer performs learning processing by using the learning data accumulated in said learning data accumulator, said display controller causes the operator to input information necessary for newly generating a category associated with newly captured video data in the category setting screen, when receiving form the operator that the new category is included in the newly captured video data and cannot be specified by the operator, when the new category is newly generated, a second video analyzer, at least having an algorithm different from that of the first video analyzer, for detecting the dangerous goods or operation belonging to the new category is newly generated.

6. A video processing method comprising:

displaying, together with a video of the video data, a category setting screen for setting a category included in the video, the category indicating the dangerous goods to be detected or operation to be detected;

accumulating, as learning data together with the video data, information of the category set in accordance with an operation by an operator to the category setting screen;

performing learning processing of the video analysis module by using the learning data accumulated in the accumulating;

analyzing video data captured by a surveillance camera by using a video analysis module, detecting a specific category, and outputting a detection result; and causing the operator to input information necessary for newly generating a new category associated with newly captured video data in the category setting screen, when receiving form the operator that the new category is included in the newly captured video data and cannot be specified by the operator;

wherein when the new category is newly generated, a second video analyzer, at least having an algorithm different from that of the first video analyzer, for detecting the new category is newly generated.

7. A non-transitory computer readable medium storing a video processing program for causing a computer to execute a method, comprising:

displaying, together with a video of the video data, a category setting screen for setting a category included in the video, the category indicating the dangerous goods to be detected or operation to be detected;

accumulating, as learning data together with the video data, information of the category set in accordance with an operation by an operator to the category setting screen;

performing learning processing of the video analysis module by using the learning data accumulated in the accumulating;

analyzing video data captured by a surveillance camera by using a video analysis module, detecting a specific category, and outputting a detection result; and causing the operator to input information necessary for newly generating a new category associated with newly captured video data in the category setting screen, when the new category is included in the newly captured video data and cannot be specified by the operator;

wherein when the new category is newly generated, a second video analyzer, at least having an algorithm different from that of the first video analyzer, for detecting the new category is newly generated.

* * * * *